(12) United States Patent
Parikh et al.

(10) Patent No.: US 7,720,484 B2
(45) Date of Patent: May 18, 2010

(54) PROXY TRANSLATOR FOR EXTENDING THE COVERAGE AREA OF A WIRELESS NETWORK

(75) Inventors: Deepak R. Parikh, Plano, TX (US); Joseph R. Cleveland, Murphy, TX (US); Purva R. Rajkotia, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 164 days.

(21) Appl. No.: 10/932,677

(22) Filed: Sep. 2, 2004

(65) Prior Publication Data

US 2006/0046754 A1 Mar. 2, 2006

(51) Int. Cl.
*H04W 72/00* (2009.01)

(52) U.S. Cl. .......... 455/450; 455/11.1; 455/16; 455/112; 455/118; 455/451; 455/452.1; 455/452.2

(58) Field of Classification Search .......... 455/450, 455/446, 20, 447, 11.1, 13.4, 16, 17, 18; 379/59
See application file for complete search history.

(56) References Cited

U.S. PATENT DOCUMENTS

| | | | | |
|---|---|---|---|---|
| 5,133,080 A | * | 7/1992 | Borras | 455/9 |
| 5,608,781 A | * | 3/1997 | Seiderman | 455/410 |
| 5,790,938 A | * | 8/1998 | Talarmo | 455/11.1 |
| 5,898,679 A | * | 4/1999 | Brederveld et al. | 370/315 |
| 5,970,410 A | * | 10/1999 | Carney et al. | 455/446 |
| 6,141,533 A | * | 10/2000 | Wilson et al. | 455/11.1 |
| 6,230,015 B1 | * | 5/2001 | Kinnunen et al. | 455/450 |
| 6,370,384 B1 | * | 4/2002 | Komara | 455/447 |
| 6,684,059 B1 | * | 1/2004 | Moerder | 455/20 |
| 6,718,160 B2 | * | 4/2004 | Schmutz | 455/11.1 |
| 6,965,594 B2 | * | 11/2005 | Boyd et al. | 370/352 |
| 2001/0031624 A1 | * | 10/2001 | Schmutz | 455/13.4 |
| 2004/0097189 A1 | * | 5/2004 | Bongfeldt et al. | 455/7 |
| 2005/0014464 A1 | * | 1/2005 | Larsson | 455/11.1 |
| 2005/0070281 A1 | | 3/2005 | Rajkotia et al. | |
| 2005/0275530 A1 | * | 12/2005 | Kates | 340/539.22 |

* cited by examiner

*Primary Examiner*—Lester Kincaid
*Assistant Examiner*—Charles Shedrick

(57) ABSTRACT

A proxy translator for use in a wireless network. The proxy translator re-transmits forward and reverse channel signals between a base station and mobile stations. The proxy translator comprises a first proxy mobile station that communicate with a base station and a proxy base transceiver subsystem (BTS) that communicates with a first mobile station. The first proxy mobile station receives forward channel signals intended for the first mobile station and transfers them to the proxy BTS for re-transmission to the first mobile station. The proxy BTS receives reverse channel signals from the first mobile station and transfers them to the first proxy mobile station for re-transmission to the base station.

27 Claims, 5 Drawing Sheets

PROXY TRANSLATOR FOR EXTENDING THE COVERAGE AREA OF A WIRELESS NETWORK

CROSS-REFERENCE TO RELATED APPLICATION

The present invention is related to that disclosed in U.S. patent application Ser. No. 10/934,012, entitled "Proxy Mobile Station Using Assignable Mobile Identifier To Access a Wireless Network," filed concurrently herewith. Patent application Ser. No. 10/934,012 is assigned to the assignee of the present application. The subject matter disclosed in patent application Ser. No. 10/934,012 is hereby incorporated by reference into the present disclosure as if fully set forth herein.

TECHNICAL FIELD OF THE INVENTION

The present invention generally relates to wireless communications and, more specifically, to a proxy translator for use in a wireless communication network.

BACKGROUND OF THE INVENTION

Wireless communication systems have become ubiquitous in society. Consumers use a wide range of devices and networks, including cellular phones, paging devices, personal communication services (PCS) systems, and wireless data networks. Wireless service providers are creating new markets for wireless devices and expanding existing markets by making wireless devices and services cheaper and more reliable. Wireless service providers attract new customers by reducing infrastructure costs and operating costs, by increasing handset battery life, and improving quality of service, and new and better features.

Inadequate coverage is a persistent problem in the quality of service of any wireless network. Natural and man-made obstacles frequently create radio frequency (RF) "holes" in the coverage area of a wireless network. Voice and data call connections are frequently dropped when a wireless terminal, such as a cell phone or a similar mobile station, enters an RF hole. Mobile stations that are already in an RF hole may not be able to reliably establish new connections. Typical areas in which RF holes occur include underground tunnels, buildings that have large footprints, tall buildings, and underground shopping malls.

Wireless service providers may attempt to improve coverage and to eliminate RF holes by one or more conventional methods. A wireless service provider may use higher transmit power from the base transceiver station (BTS) to maintain communication with a mobile station (MS). However, the result is an increase in the noise floor experienced by other mobile stations in the coverage area of the serving BTS, leading to an overall increase in total BTS transmit power and a reduction in the percentage of transmit power available to support other calls.

Alternatively, a wireless service provider may attempt to improve coverage by installing another base transceiver system (BTS) in the area of poor coverage. A disadvantage of this method is the cost associated with acquisition and deployment of a complete base transceiver station. A typical full-service BTS may cost between $500,000 and $750,000. Adding another BTS also requires the added cost of provisioning a dedicated backhaul link to provide network connectivity. Still another disadvantage of adding a new BTS is that these devices are provider specific. Devices from two different vendors cannot be interchanged or operated in a given network.

Also, a wireless service provider may attempt to improve coverage by deploying RF repeater transceivers. Unfortunately, a repeater re-broadcasts the entire set of signals for all calls carried by the serving BTS, not just for those mobile stations in the poor coverage area. As a result, the mobile stations in the poor coverage area experience a higher noise floor. Thus, increased transmit power causes higher forward link transmit power per user channel on the serving BTS. In CDMA technology, the RF noise in the operating frequency is an important factor, especially in the forward link (i.e., transmission from BTS to MS). The repeater amplifiers add noise on both forward and reverse links. Thus, using repeaters degrades overall network performance by increasing noise in the environment and reduces the traffic capacity of the network.

Therefore, there is a need in the art for improved wireless networks having improved RF coverage. In particular, there is a need for an apparatus that can improve service in an area of poor RF coverage without significantly increasing transmit power in within the cell site or in neighboring cell sites.

SUMMARY OF THE INVENTION

The present invention provides an apparatus and related method that extend the coverage area of a CDMA system into an area of high path loss (i.e., poor coverage) or into an area with high interference, such as multiple pilot signals from neighboring cells. The present invention comprises a proxy translator that mimics the operation of a base transceiver subsystem (BTS) in the forward channel and mimics the operation of mobile station (MS) in the reverse channel. In the forward channel, the actual BTS communicates with a proxy mobile station (PMS), which communicates internally in the proxy translator with a proxy BTS (PBTS). The proxy BTS, in turn, communicates with the actual mobile station. In the reverse channel, the actual mobile station communicates with the proxy BTS, which communicates internally with the proxy MS. The proxy MS, in turn, communicates with the actual BTS.

To address the above-discussed deficiencies of the prior art, it is a primary object of the present invention to provide, for use in a wireless network, a proxy translator capable of retransmitting forward channel signals from a base station of the wireless network to a plurality of mobile stations accessing the wireless network. According to an advantageous embodiment of the present invention, the proxy translator comprises: 1) a plurality of proxy mobile stations capable of receiving forward channel signals transmitted by the base station, wherein a first of the proxy mobile stations receives and down-converts a first forward channel signal associated with a first target mobile station to thereby produce a first proxy signal; and 2) a proxy base transceiver subsystem capable of receiving the first proxy signal from the first proxy mobile station, up-converting the first proxy signal to thereby produce a second forward channel signal, and transmitting the second forward channel signal to the first target mobile station.

According to one embodiment of the present invention, a second of the proxy mobile stations receives and down-converts a third forward channel signal associated with a second target mobile station to thereby produce a second proxy signal.

According to another embodiment of the present invention, the proxy base transceiver subsystem is further capable of receiving the second proxy signal from the second proxy mobile station, up-converting the second proxy signal to thereby produce a fourth forward channel signal, and transmitting the fourth forward channel signal to the second target mobile station.

According to still another embodiment of the present invention, the proxy base transceiver subsystem is further capable of receiving a first reverse channel signal from the first target mobile station, down-converting the first reverse channel signal to thereby produce a third proxy signal.

According to yet another embodiment of the present invention, the first proxy mobile station is capable of receiving the third proxy signal from the proxy base transceiver subsystem, up-converting the third proxy signal to thereby produce a second reverse channel signal, and transmitting the second reverse channel signal to the base station.

According to a further embodiment of the present invention, the proxy base transceiver subsystem is further capable of receiving a third reverse channel signal from the second target mobile station, down-converting the third reverse channel signal to thereby produce a fourth proxy signal.

According to a still further embodiment of the present invention, the second proxy mobile station is capable of receiving the fourth proxy signal from the proxy base transceiver subsystem, up-converting the fourth proxy signal to thereby produce a fourth reverse channel signal, and transmitting the fourth reverse channel signal to the base station.

According to a yet further embodiment of the present invention, the proxy translator further comprises a controller capable of assigning the first proxy mobile station to process forward and reverse channel signals associated with the first target mobile station and capable of assigning the second proxy mobile station to process forward and reverse channel signals associated with the second target mobile station.

In one embodiment of the present invention, the controller programs the first proxy mobile station with a first Electronic Serial Number associated with the first target mobile station.

In another embodiment of the present invention, the controller programs the second proxy mobile station with a second Electronic Serial Number associated with the second target mobile station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 5, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
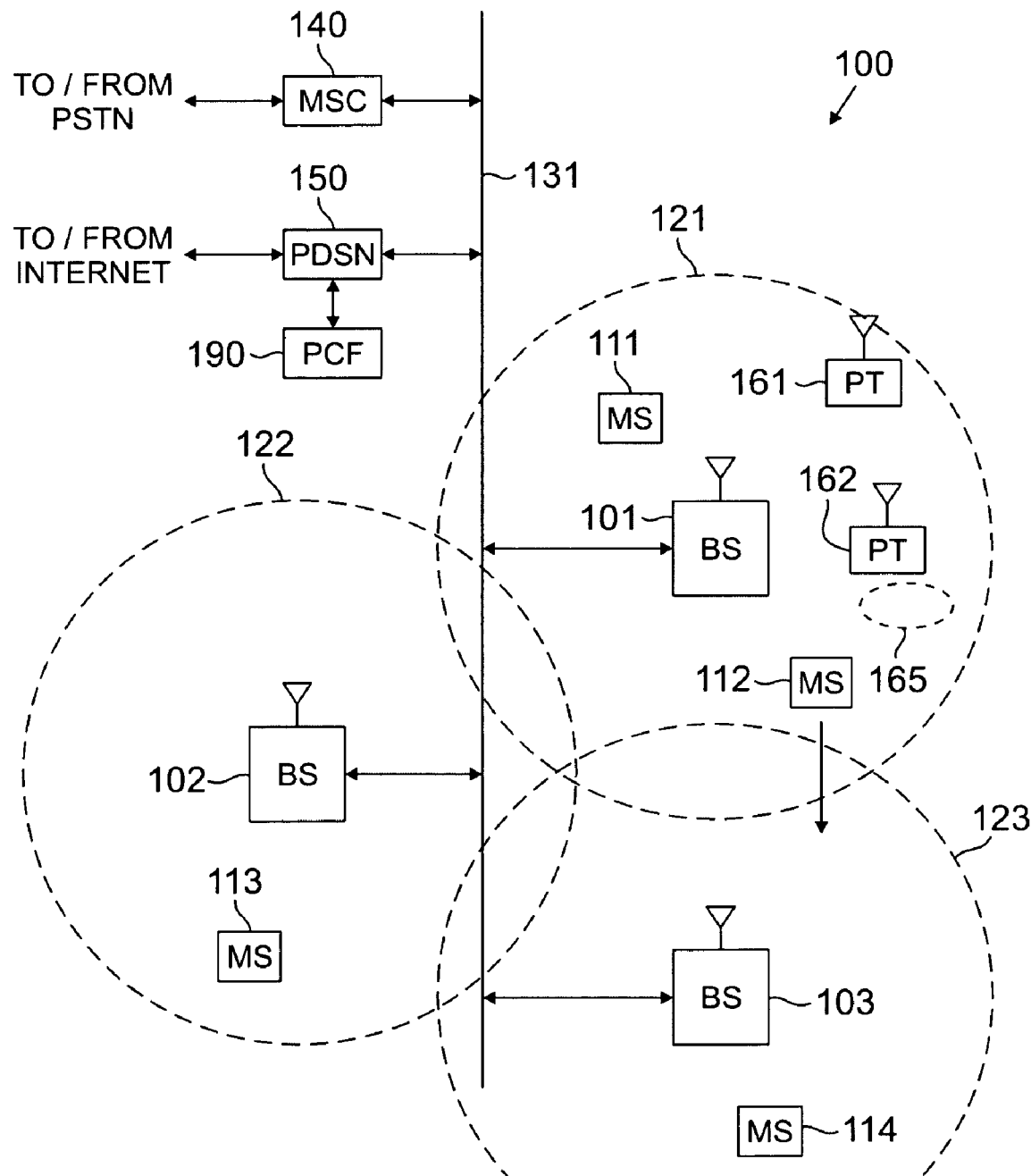
FIG. 1 illustrates an exemplary wireless network that implements a plurality of proxy translators according to the principles of the present invention.

FIG. 1 illustrates exemplary wireless network 100, implements a plurality of proxy translators according to the principles of the present invention. Wireless network 100 comprises a plurality of cell sites 121-123, each containing one of the base stations, BS 101, BS 102, or BS 103. Base stations 101-103 communicate with a plurality of mobile stations (MS) 111-114 using, for example, the CDMA2000 air interface standard. In an advantageous embodiment of the present invention, mobile stations 111-114 are capable of receiving data traffic and/or voice traffic on two or more channels simultaneously. Mobile stations 111-114 may be any suitable wireless devices (e.g., conventional cell phones, PCS handsets, personal digital assistant (PDA) handsets, portable computers, telemetry devices) that are capable of communicating with base stations 101-103 via wireless links.

The present invention is not limited to communicating with mobile devices. The present invention also encompasses other types of wireless access terminals, including fixed wireless terminals. For the sake of simplicity, only mobile stations are shown and discussed hereafter. However, it should be understood that the use of the term "mobile station" in the claims and in the description below is intended to encompass both truly mobile devices (e.g., cell phones, wireless laptops) and stationary wireless terminals (e.g., a machine monitor with wireless capability).

Dotted lines show the approximate boundaries of cell sites 121-123 in which base stations 101-103 are located. The cell sites are shown approximately circular for the purposes of illustration and explanation only. It should be clearly understood that the cell sites may have other irregular shapes, depending on the cell configuration selected and natural and man-made obstructions.

As is well known in the art, each of cell sites 121-123 is comprised of a plurality of sectors, where a directional antenna coupled to the base station illuminates each sector. The embodiment of FIG. 1 illustrates the base station in the center of the cell. Alternate embodiments may position the directional antennas in corners of the sectors. The system of the present invention is not limited to any particular cell site configuration.

In one embodiment of the present invention, each of BS 101, BS 102 and BS 103 comprises a base station controller (BSC) and one or more base transceiver subsystem(s) (BTS). Base station controllers and base transceiver subsystems are well known to those skilled in the art. A base station controller is a device that manages wireless communications resources, including the base transceiver subsystems, for specified cells within a wireless communications network. A base transceiver subsystem comprises the RF transceivers, antennas, and other electrical equipment located in each cell site. This equipment may include air conditioning units, heating units, electrical supplies, telephone line interfaces and RF transmitters and RF receivers. For the purpose of simplicity and clarity in explaining the operation of the present invention, the base transceiver subsystems in each of cells 121, 122 and 123 and the base station controller associated with each base transceiver subsystem are collectively represented by BS 101, BS 102 and BS 103, respectively.

BS 101, BS 102 and BS 103 transfer voice and data signals between each other and the public switched telephone network (PSTN) (not shown) via communication line 131 and mobile switching center (MSC) 140. BS 101, BS 102 and BS 103 also transfer data signals, such as packet data, with the Internet (not shown) via communication line 131 and packet data server node (PDSN) 150. Packet control function (PCF) unit 190 controls the flow of data packets between base stations 101-103 and PDSN 150. PCF unit 190 may be implemented as part of PDSN 150, as part of MSC 140, or as a stand-alone device that communicates with PDSN 150, as shown in FIG. 1. Line 131 also provides the connection path for control signals transmitted between MSC 140 and BS 101, BS 102 and BS 103 that establish connections for voice and data circuits between MSC 140 and BS 101, BS 102 and BS 103.

Communication line 131 may be any suitable connection means, including a T1 line, a T3 line, a fiber optic link, a network packet data backbone connection, or any other type of data connection. Line 131 links each vocoder in the BSC with switch elements in MSC 140. The connections on line 131 may transmit analog voice signals or digital voice signals in pulse code modulated (PCM) format, Internet Protocol (IP) format, asynchronous transfer mode (ATM) format, or the like.

MSC 140 is a switching device that provides services and coordination between the subscribers in a wireless network and external networks, such as the PSTN or Internet. MSC 140 is well known to those skilled in the art. In some embodiments of the present invention, communications line 131 may be several different data links where each data link couples one of BS 101, BS 102, or BS 103 to MSC 140.

In the exemplary wireless network 100, MS 111 is located in cell site 121 and is in communication with BS 101. MS 113 is located in cell site 122 and is in communication with BS 102. MS 114 is located in cell site 123 and is in communication with BS 103. MS 112 is also located close to the edge of cell site 123 and is moving in the direction of cell site 123, as indicated by the direction arrow proximate MS 112. At some point, as MS 112 moves into cell site 123 and out of cell site 121, a hand-off will occur.

Natural and man-made obstacles create radio frequency (RF) holes in the coverage area of wireless network 100. By way of example, RF hole 165 (indicated by dotted line) exists in cell site 121. If MS 111 or MS 112 enters RF hole 165, an existing voice call or data call connection may be dropped. Also, MS 111 or MS 112 may not be able to reliably establish new call connections.

Accordingly, to eliminate RF holes, such as RF hole 165, and to extend coverage area, wireless network 100 further comprises proxy translator (PT) 161 and proxy translator (PT) 162. PT 161 is disposed near the outer boundary of cell site 121 and extends the range of BS 101 to reach mobile stations that are in the vicinity of PT 161, but just outside the coverage area of cell site 121. Deploying PT 161 in this manner may be necessary if it would be prohibitively expensive to add a new cell site next to cell site 121. PT 162 is disposed near the edge of RF hole 165 and improves coverage within RF hole 165. Advantageously, PT 161 increases the strength of forward and reverse channel signals only in the vicinity of the outer edge of cell site 121 and PT 162 increases the strength of forward and reverse channel signals only in the vicinity of RF hole 165. Thus, the amount of increased signal interference in adjacent cell sites 122 and 123 is minimal or non-existent.

Figure 2:
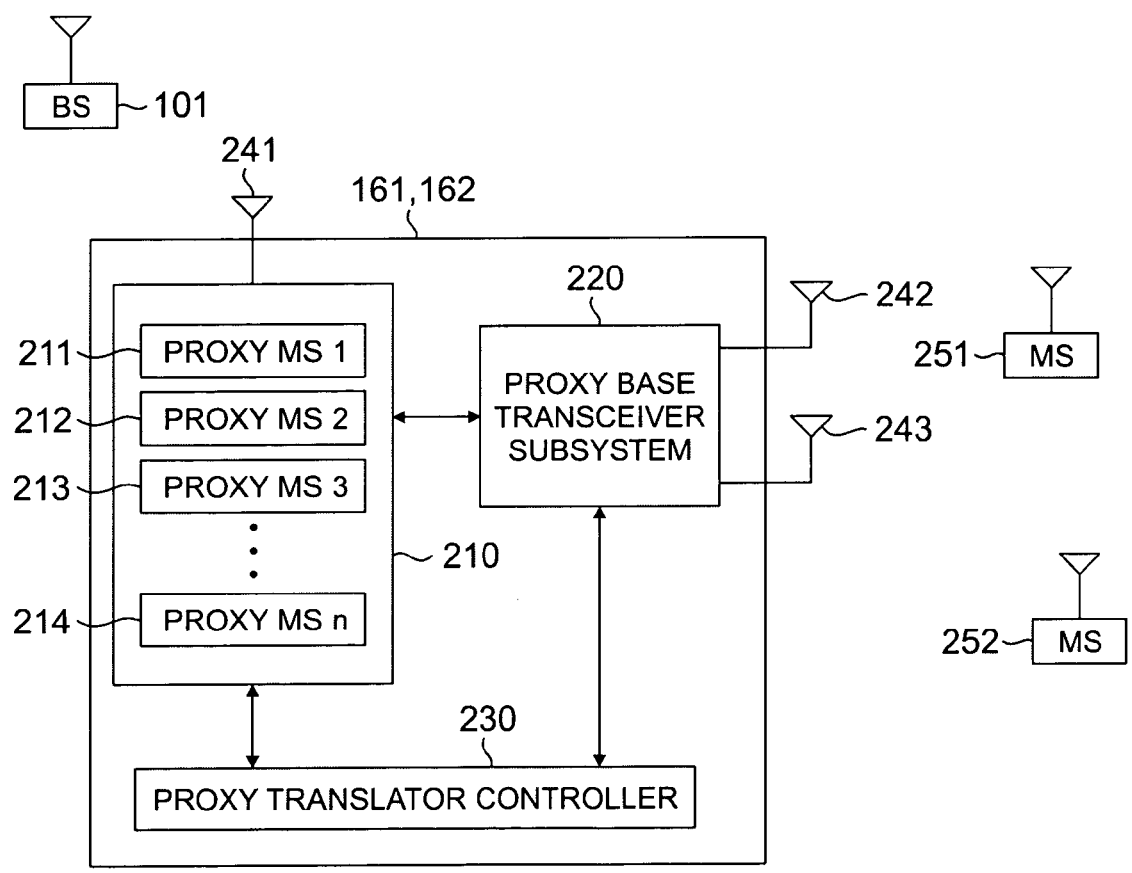
FIG. 2 illustrates the exemplary proxy translators in FIG. 1 in greater detail according to an exemplary embodiment of the present invention.

FIG. 2 illustrates exemplary proxy translators 161 and 162 in greater detail according to an exemplary embodiment of the present invention. Since proxy translator (PT) 161 and proxy translator (PT) 162 are substantially identical, it is unnecessary and redundant to explain the operation of each PT separately. Therefore, the explanation of the present invention that follows will generally be limited to discussion of PT 162.

PT 162 comprises proxy mobile station pool 210, proxy base transceiver subsystem (BTS) 220, and proxy translator controller 230, and antenna 241-243. Proxy translator controller 230 directs the overall operation of PT 162. Proxy mobile station pool 210 comprises N proxy mobile stations, including exemplary proxy mobile stations 211-214. Proxy mobile station (MS) 211, proxy mobile station (MS) 212, proxy mobile station (MS) 213, and proxy mobile station (MS) 214 are arbitrarily labeled Proxy MS 1, Proxy MS 2, Proxy MS 3, and Proxy MS n, respectively.

Proxy mobile stations 211-214 communicate with base station 101 via antenna 241. Proxy BTS 220 communicates with mobile stations 251 and 252 via main antenna 242 and, optionally, via a receive diversity antenna 243. Mobile station (MS) 251 and mobile station (MS) 252 are disposed in or near RF hole 165 (or, in the case of PT 161, near or beyond the outer boundary of cell site 121). According to an advantageous embodiment of the present invention, each one of the proxy mobile stations in proxy mobile station pool 210 comprises a programmable (or configurable) RF transceiver and associated signal processing circuits that are capable of performing all of the functions of a conventional wireless mobile station, such as, for example, a CDMA2000 compatible cell phone or similar wireless terminal.

Proxy mobile stations 211-214 in proxy translator 162 are located at the edge of the region of good coverage and operate in conjunction with BS 101 to provide extended coverage in RF hole 165. Each one of proxy mobile stations 211-214 is capable of serving as a proxy or substitute for MS 251 or MS 252 or other mobile stations in RF hole 165. Each one of proxy mobile stations 211-214 communicates with BS 101 on the CDMA air interface on behalf of one of MS 251 or MS 252 or other mobile stations in RF hole 165. Proxy BTS 220, also placed at the edge of the region of good coverage, communicates with MS 251 or MS 252 or other mobile stations in RF hole 165 as a proxy or substitute for BS 101. A selected one of proxy mobile stations 211-214 receives overhead channels from BS 101 and transfers the overhead channel signals to proxy BTS 220, which transmits the overhead signals to MS 251, MS 252, and other mobile stations in RF hole 165.

Proxy translator controller 230 assigns a proxy mobile station (e.g., proxy MS 211) as a substitute for each mobile station (e.g., MS 251) in RF hole 165. During a call, the assigned proxy mobile station 211 communicates with BS 101 while proxy BTS 220 communicates with mobile station 251. A data link between proxy BTS 220 and proxy MS 211 transfers the user data and control signals on the forward and reverse links. This mimics the operation of MS 251 if MS 251 were capable of direct communication with BS 101. This enables wireless network 100 to treat MS 251 as a normal mobile station. Proxy translator controller 230 dynamically assigns and de-assigns the mobile station identifier (MS_ID) of MS 251 to proxy MS 211 as MS 251 enters and exits RF hole 165. Thus, from the perspective of BS 101, proxy MS 211 appears to be the same device as MS 251.

The mobile station identifier (MS_ID) of MS 251 (or any other mobile station) is a fixed length (e.g., 32 bits, 64 bits) value or variable length value that uniquely describes the mobile station (or other wireless terminal). The MS_ID may comprise a conventional identifier, such as an Electronic Serial Number (ESN), a User Identity Module (UIM) ID, a Subscriber Identity Module (SIM) ID, or a Mobile Equipment Identifier (MEID), among others.

In the forward channel, proxy BTS 220 multiplexes and transmits only the user data information received from active (or assigned) proxy mobile stations in proxy mobile station pool 210. Thus, only forward channel signals directed to MS 251, MS 252 or other mobile stations in RF hole 165 are retransmitted. This results in much less transmit power in the forward channel compared to conventional repeaters, which retransmit all forward channels signals, including forward channels signals for mobile stations that are not in or near RF hole 165. In the reverse channel, proxy BTS 220 receives reverse channel signals from MS 252, MS 252 and other mobile station in or near RF hole 165. The reverse channel signals are demodulated and transferred to the appropriate one of proxy mobile stations 211-214 for retransmission to BS 101.

According to an exemplary embodiment of the present invention, control messages and user data traffic in the forward and reverse channels are transferred between proxy BTS 220 and proxy mobile stations 211-214 as proxy signals. For the purposes of this disclosure, the term "proxy signals" may include baseband signals, intermediate frequency (IF) signals, radio frequency (RF) signals, and any other form of processed signals that may be derived from the actual signals received by antennas 241-243. For example, proxy BTS 220 may down-convert a reverse channel RF signal received from antenna 242 to a baseband signal, an IF signal, or another RF signal that is transferred to proxy mobile station 211. Proxy MS 211 then up-converts the proxy signal from proxy BTS 220 for retransmission to BS 101. Similarly, proxy MS 211 may convert a forward channel RF signal received from antenna 241 to a baseband signal, a IF signal, or another RF signal that is transferred to proxy BTS 220. Proxy BTS 220 then up-converts the proxy signal from proxy MS 211 for retransmission to mobile stations 251 and 252.

Proxy translator 162 transmits on the same frequency and pseudo-random noise (PN) offset as BS 101. Proxy translator 162 is designed to utilize high front-to-back isolation of the antenna system such that forward channel signals re-transmitted to MS 251 and MS 252 do not interfere with the forward channel signals received from BS 101. Because proxy translator 162 transmits on the same PN offset as BS 101, a handoff operation to another base station remains the same as that of BS 101 under normal configuration.

If MS 251 is initially off and is activated when it is already in RF hole 165, MS 251 initially detects the control signals (pilot, access, etc.) that are transmitted by proxy translator 162. Since these control signals are the same as the control signals transmitted by BS 101, MS 251 accesses proxy translator 162 in the same manner that MS 251 would access BS 101. Thus, MS 251 transmits the mobile station identifier (e.g., ESN) associated with MS 251 as part of the normal process of accessing a base station under, for example, the CDMA2000 protocol). When proxy translator 162 receives the mobile station identifier from MS 251, proxy translator 162 programs proxy mobile station 211 to use the same mobile station identifier to access BS 101. Thus, proxy mobile station 211 appears the same to BS 101 as MS 251 would appear.

However, MS 251 may not always be activated after MS 251 is already in RF hole 165. In many situations, MS 251 may roam into RF hole 165 after MS 251 has already accessed BS 101. In this situation proxy translator 162 must obtain the mobile station identifier from MS 251 by some other means. In one embodiment of the present invention, when proxy translator 162 detects the present of MS 251, proxy translator 162 may use a new special-purpose control channel message that prompts MS 251 to re-transmit its mobile station identifier. As an example of implementation for the CDMA2000 family of standards, changes may be made to existing CDMA2000 protocol messages, including base station-assigned messages such as the Extended Channel Assignment Message (ECAM), the Universal Handoff Direction Message (UHDM), and the In-Traffic System Parameters Message (ITSPM). The changes may be made to fields carrying the identifier information, either as a part of upper layer signaling or as a part of LAC addressing. To prevent the mobile station identifier information from being misused by hackers, the mobile station identifier may be encrypted before it is sent over the air.

In an alternate embodiment of the present invention, proxy translator may use a special-purpose traffic channel message that prompts MS 251 to re-transmit its mobile station identifier. By way of example, U.S. patent application Ser. No. 10/672,607, filed Sep. 26, 2003, entitled "System and Method for Providing Mobile Station Registration in a Traffic Channel in a Wireless Communication System" discloses a wireless network that uses a traffic channel to register a mobile station and to obtain an ESN from the mobile station. U.S. patent application Ser. No. 10/672,607, which is assigned to the assignee of the present application, is hereby incorporated by reference into the present disclosure as if fully set forth herein.

Figure 3:
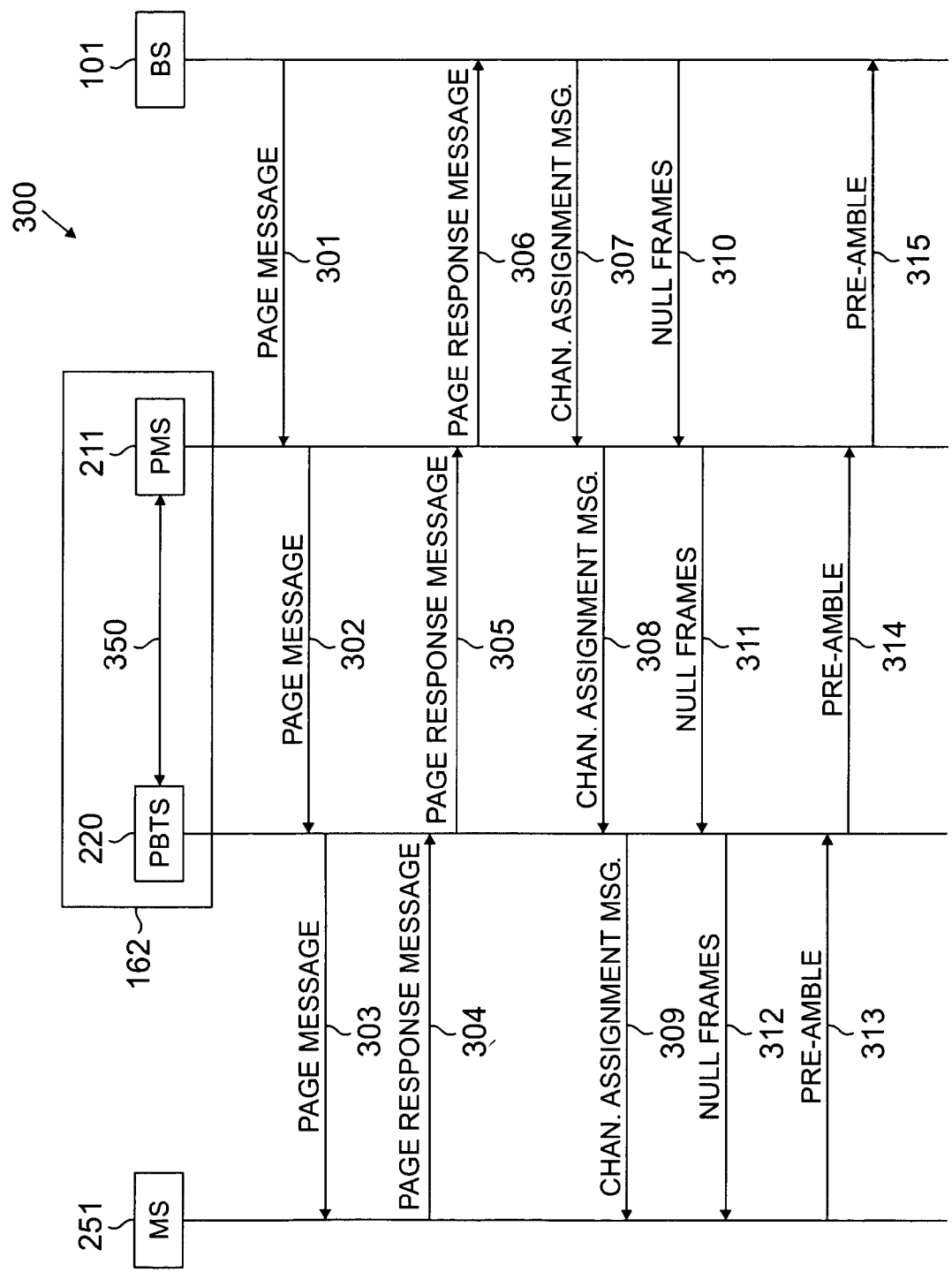
FIG. 3 is a message flow diagram illustrating the operation of a proxy translator during a mobile-terminated call operation according to one embodiment of the present invention.

FIG. 3 depicts message flow diagram 300, which illustrates the operation of proxy translator 162 during a mobile-terminated call operation according to an exemplary embodiment of the present invention. In FIG. 3, it is assumed that MS 251 has roamed into, or was activated within, the coverage area of proxy translator 162 and has already accessed wireless network 100 via PT 162. Initially, BS 101 transmits Page message 301 in the forward channel to proxy mobile station 211 via the air interface. Proxy mobile station 211 then transmits Page message 302 as a proxy signal via wireline 350 to proxy BTS 220. Finally, proxy BTS 220 transmits Page message 303 via the air interface to mobile station 251.

Mobile station 251 responds in the reverse channel by transmitting Page Response message 304 via the air interface to proxy BTS 220. Proxy BTS then transmits Page Response message 305 as a proxy signal via wireline 350 to proxy mobile station 211. Finally, proxy mobile station 211 transmits Page Response message 306 via the air interface to base station 101. Next, BS 101 transmits Channel Assignment message 307 in the forward channel to proxy mobile station 211 via the air interface. Proxy mobile station 211 then transmits Channel Assignment message 308 as a proxy signal via wireline 350 to proxy BTS 220. Proxy BTS 220 then transmits Channel Assignment message 309 via the air interface to mobile station 251.

BS 101 transmits Null Frames 310 in the forward channel to proxy mobile station 211 via the air interface. Proxy mobile station 211 then transmits Null Frames 311 as a proxy signal via wireline 350 to proxy BTS 220. Proxy BTS 220 then transmits Null Frames 312 via the air interface to mobile station 251. Mobile station 251 responds in the reverse channel by transmitting Preambles 313 via the air interface to proxy BTS 220. Proxy BTS then transmits Preambles 314 as a proxy signal via wireline 350 to proxy mobile station 211. Finally, proxy mobile station 211 transmits Preambles 315 via the air interface to base station 101.

The message flow in FIG. 3 continues for the duration of the call session, as conventional CDMA2000 messages are transmitted between MS 101 and MS 251 using PT 162 as an intermediary. It is not necessary to illustrate the remainder of the call session, however.

Figure 4:
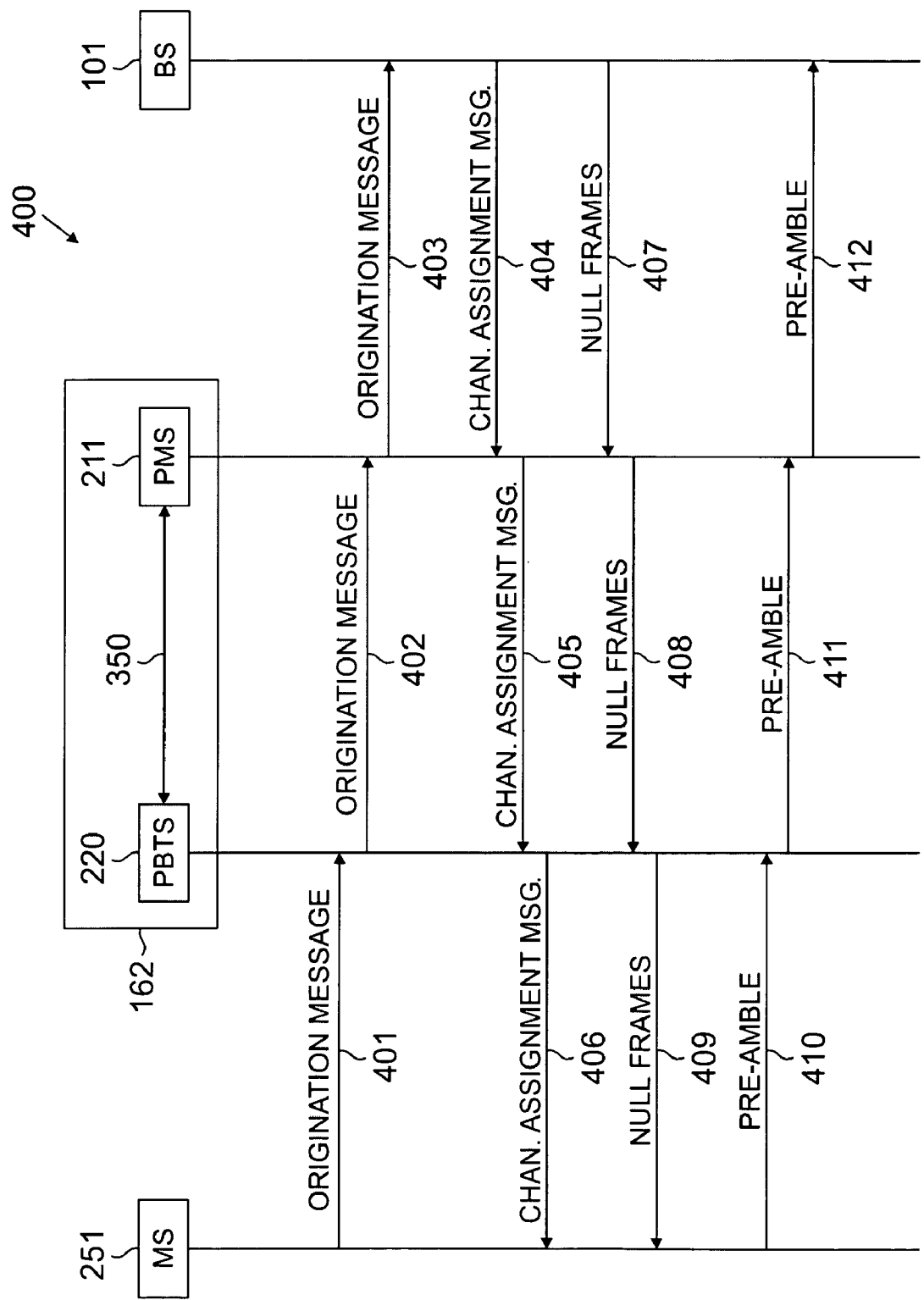
FIG. 4 is a message flow diagram illustrating the operation of a proxy translator during a mobile-originated call operation according to another embodiment of the present invention.

FIG. 4 depicts message flow diagram 400, which illustrates the operation of proxy translator 162 during a mobile-originated call operation according to an exemplary embodiment of the present invention. In FIG. 4, it is assumed that MS 251 has roamed into, or was activated within, the coverage area of proxy translator 162 and has already accessed wireless network 100 via PT 162. Initially, mobile station 251 transmits in the reverse channel by transmitting Origination message 401 via the air interface to proxy BTS 220. Proxy BTS then transmits Origination message 402 as a proxy signal via wireline 350 to proxy mobile station 211. Finally, proxy mobile station 211 transmits Origination message 403 via the air interface to base station 101.

Next, BS 101 transmits Channel Assignment message 404 in the forward channel to proxy mobile station 211 via the air interface. Proxy mobile station 211 then transmits Channel Assignment message 405 as a proxy signal via wireline 350 to proxy BTS 220. Proxy BTS 220 then transmits Channel Assignment message 406 via the air interface to mobile station 251.

BS 101 transmits Null Frames 407 in the forward channel to proxy mobile station 211 via the air interface. Proxy mobile station 211 then transmits Null Frames 408 as a proxy signal via wireline 350 to proxy BTS 220. Proxy BTS 220 then transmits Null Frames 409 via the air interface to mobile station 251. Mobile station 251 responds in the reverse channel by transmitting Preambles 410 via the air interface to proxy BTS 220. Proxy BTS then transmits Preambles 411 as a proxy signal via wireline 350 to proxy mobile station 211. Finally, proxy mobile station 211 transmits Preambles 412 via the air interface to base station 101.

The message flow in FIG. 4 continues for the duration of the call session, as conventional CDMA2000 messages are transmitted between MS 101 and MS 251 using PT 162 as an intermediary. It is not necessary to illustrate the remainder of the call session, however.

Advantageously, the present invention does not retransmit all of the received RF signals from BS 101. Instead, proxy BTS 220 and proxy MS 211 only retransmit signals for mobile stations within or near RF hole 165. With a lower noise floor in the poor coverage area, the performance of the entire cell coverage by BS 101 is improved. Also, proxy translator 162 is able to communicate over the air with an existing base station and does not need any other network connections in order to function.

Since proxy mobile stations 211-214 imitate (or "spoof") the control and traffic signals of actual mobile stations and proxy BTS 220 imitates the control and traffic signals of BS 101, it is possible to daisy chain two or more proxy translators. For example, if proxy translator 161 is close enough to proxy translator 162, proxy mobile stations 211-214 of proxy translator 161 may communicate with proxy BTS 220 of proxy translator 162. Thus, at one end, proxy mobile stations 211-214 of proxy translator 162 would communicate with BS 101. At the other end, proxy BTS 220 of proxy translator 161 would communicate with mobile stations 251 and 252. In the middle, proxy mobile stations 211-214 of proxy translator 161 would communicate with proxy BTS 220 of proxy translator 162.

Even if two proxy translators are not set up in a daisy chain configuration, it still is possible for two proxy translators to interoperate. For example, it is possible to perform a handoff of a mobile station from a first proxy translator to a second proxy translator. Such a handoff is described below with respect to FIG. 5.

Figure 5:
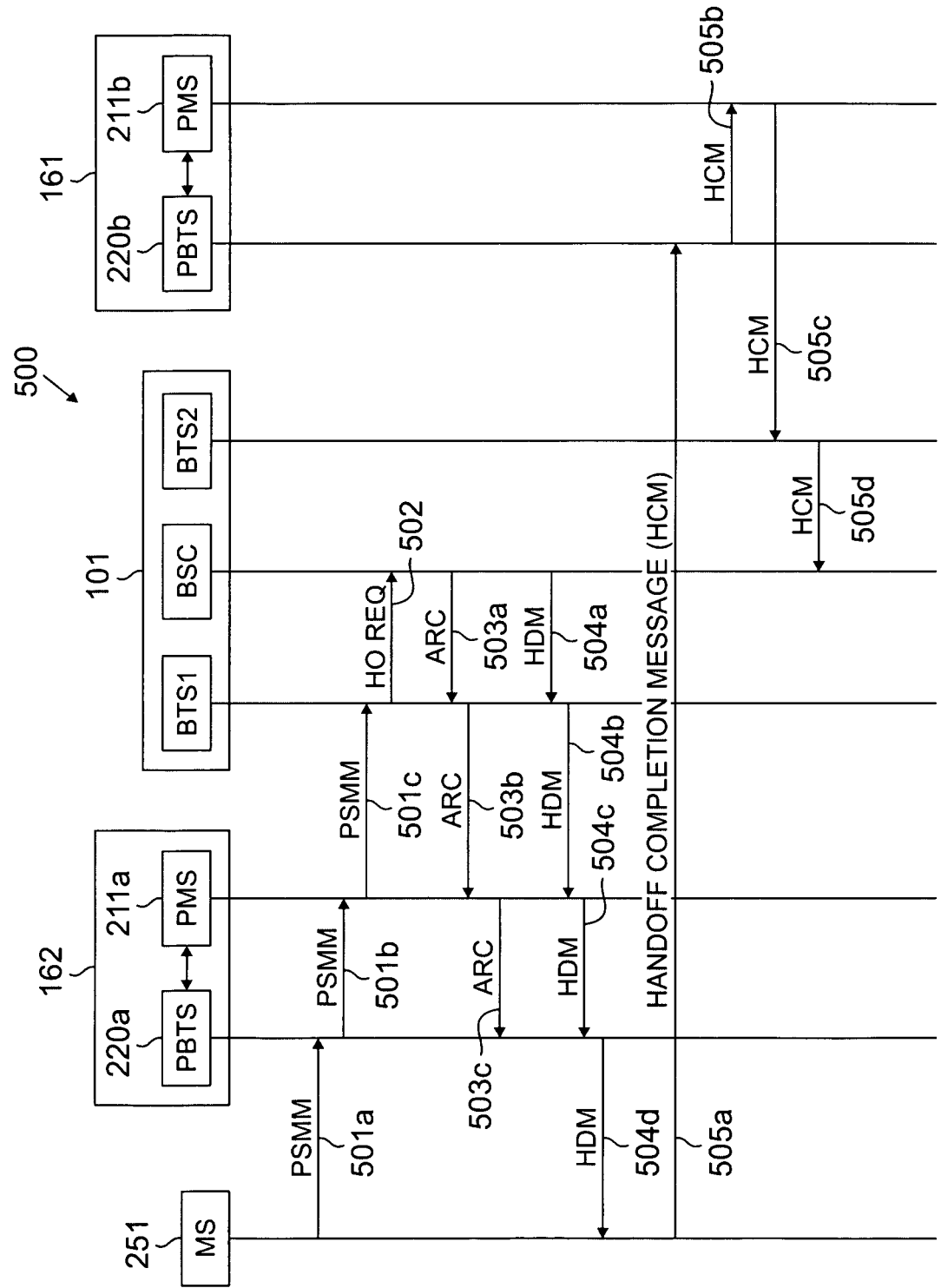
FIG. 5 is a message flow diagram 500 illustrating a handoff between two proxy translators according to the principles of the present invention.

FIG. 5 depicts message flow diagram 500, which illustrates a handoff operation between two proxy translators according to the principles of the present invention. For example, if proxy translator 161 is close enough to proxy translator 162, mobile station 251 could be handed off from proxy translator 162 to proxy translator 162, or vice versa. In FIG. 5, it is assumed that MS 251 has roamed into, or was activated within, the coverage area of proxy translator 162 and has already accessed wireless network 100 via PT 162.

In the operation depicted in FIG. 5, MS 251 is handed off from a first base transceiver subsystem (BTS1) associated with BS 101 to a second base transceiver subsystem (BTS2) associated with BS 101. PT 162 communicates with BTS1 and transmits the forward and reverse traffic channel signals and the control channel signals (including the pilot signal) associated with PT 162. Similarly, PT 161 communicates with BTS2 and transmits the forward and reverse traffic channel signals and the control channel signals (including the pilot signal) associated with PT 161.

During routine operation, mobile station 251 transmits Pilot Strength Measurement message (PSMM) 501a to proxy BTS 220a in PT 162. PSMM 501a reports the strengths of the pilot signals from PT 162 and PT 161, as seen by MS 251. Proxy BTS 220a transmits PSMM 501b to proxy mobile station 211a, which transmits PSMM 501c to BTS1. Since the pilot signal from PT 161 is stronger than the pilot signal from PT 162, BTS1 transmits Handoff (HO) Request message 502 to the base station controller (BSC) of BS 101.

In response to Handoff Request message 502, the BSC transmits Assignment Request and Confirmation (ARC) message 503a to BTS1. BTS 1 then transmits ARC message 503b to proxy mobile station 211a, which transmits ARC message 503c to proxy BTS 220a. The BSC also transmits Handoff Direction message (HDM) 504a to BTS1. BTS 1 then transmits HDM 504b to proxy mobile station 211a, which transmits HDM 504*c* to proxy BTS 220*a*. Proxy BTS 220*a* then transmits HDM 504*d* to MS 251.

In response, MS 251 transmits Handoff Completion message (HCM) 505*a* to proxy BTS 220*b* of PT 161. Proxy BTS 220*b* transmits HCM 505*b* to proxy mobile station 211*b*, which transmits HCM 505*c* to BTS2 in BS 101. Finally, BTS2 transmits HCM 505*d* to the BSC, thereby completing the handoff of MS 251 from PT 162 to PT 161.

Those skilled in the art will understand that the handoff procedure described in FIG. 5 is not limited to handoffs between base transceiver subsystems associated with the same base station.

Those skilled in the art will be able to adapt the message flow in FIG. 5 to provide an alternate embodiment which performs a handoff from a first BTS associated with a first base station to a second BTS associated with a second base station via the mobile switching center (MSC) of a wireless network. Such an alternate embodiment will still fall within the scope of the present invention.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a wireless network, a proxy translator to retransmit forward channel signals from a base station of said wireless network to a plurality of mobile stations accessing said wireless network, said proxy translator comprising:
    a plurality of proxy mobile stations dynamically configured to serve as substitutes for a first set of mobile stations within a radio frequency hole and a coverage area of said proxy translator and to receive a first set of forward channel signals transmitted by said base station to said first set of mobile stations and to receive a second set of forward channel signals transmitted by said base station to a second set of mobile stations, wherein said proxy mobile stations down-convert said first set of forward channel signals to produce a plurality of proxy signals; and
    a proxy base transceiver subsystem to receive said proxy signals from said proxy mobile stations, up-converting said proxy signals to produce a third set of forward channel signals based on said first set of forward channel signals, and transmitting said third set of forward channel signals to said first set of mobile stations, wherein the proxy base transceiver subsystem determines that said first set of mobiles stations are near or within an RF hole, transmits said third set of forward channel signals to said first set of mobile stations, and adjusts the power used to transmit the third set of forward channels transmitted to said first set of mobile stations so it does not create interference with the base station, and wherein the power is adjusted to only to be increased in the vicinity of the RF hole.

2. The proxy translator as set forth in claim 1, wherein a first of said proxy mobile stations receives and down-converts a first forward channel signal associated with a first target mobile station to thereby produce a first proxy signal, wherein said proxy base transceiver subsystem receives said first proxy signal from said first proxy mobile station, up-converts said first proxy signal to thereby produce a second forward channel signal, and transmits said second forward channel signal to said first target mobile station, and wherein a second of said proxy mobile stations receives and down-converts a third forward channel signal associated with a second target mobile station to thereby produce a second proxy signal.

3. The proxy translator as set forth in claim 2, wherein said proxy base transceiver subsystem is further capable of receiving said second proxy signal from said second proxy mobile station, up-converting said second proxy signal to thereby produce a fourth forward channel signal, and transmitting said fourth forward channel signal to said second target mobile station.

4. The proxy translator as set forth in claim 3, wherein said proxy base transceiver subsystem is further capable of receiving a first reverse channel signal from said first target mobile station, down-converting said first reverse channel signal to thereby produce a third proxy signal.

5. The proxy translator as set forth in claim 4, wherein said first proxy mobile station is capable of receiving said third proxy signal from said proxy base transceiver subsystem, up-converting said third proxy signal to thereby produce a second reverse channel signal, and transmitting said second reverse channel signal to said base station.

6. The proxy translator as set forth in claim 5, wherein said proxy base transceiver subsystem is further capable of receiving a third reverse channel signal from said second target mobile station, down-converting said third reverse channel signal to thereby produce a fourth proxy signal.

7. The proxy translator as set forth in claim 6, wherein said second proxy mobile station is capable of receiving said fourth proxy signal from said proxy base transceiver subsystem, up-converting said fourth proxy signal to thereby produce a fourth reverse channel signal, and transmitting said fourth reverse channel signal to said base station.

8. The proxy translator as set forth in claim 7, further comprising a controller capable of assigning said first proxy mobile station to process forward and reverse channel signals associated with said first target mobile station and capable of assigning said second proxy mobile station to process forward and reverse channel signals associated with said second target mobile station.

9. The proxy translator as set forth in claim 8, wherein said controller programs said first proxy mobile station with a first Electronic Serial Number associated with said first target mobile station.

10. The proxy translator as set forth in claim 9, wherein said controller programs said second proxy mobile station with a second Electronic Serial Number associated with said second target mobile station.

11. A wireless network comprising:
    a plurality of base stations to communicate with a plurality of mobile stations in a coverage area of said wireless network; and
    a proxy translator to retransmit forward channel signals from a first base station of said wireless network to said plurality of mobile stations accessing said wireless network, said proxy translator comprising:
    a plurality of proxy mobile stations dynamically configured to serve as substitutes for a first set of mobile stations within a radio frequency hole and a coverage area of said proxy translator and to receive a first set of forward channel signals transmitted by said first base station to said first set of mobile stations and to receive a second set of forward channel signals transmitted by said first base station to a second set of mobile stations, wherein said proxy mobile stations down-convert said first set of forward channel signals to produce a plurality of proxy signals, and wherein said second set of forward channel signals remain unprocessed; and
    a proxy base transceiver subsystem to receive said proxy signals from said proxy mobile stations, up-converting said proxy signals to produce a third set of forward channel signals based on said first set of forward channel signals, and transmitting said third set of forward channel signals to said first set of mobile stations, wherein said proxy translator fails to transmit signals based on said second set of forward channel signals to said second set of mobile stations, wherein the proxy base transceiver subsystem determines that said first set of mobiles stations are near or within an RF hole, transmits said third set of forward channel signals to said first set of mobile stations, and adjusts the power used to transmit the third set of forward channels transmitted to said first set of mobile stations so it does not create interference with the base station, and wherein the power is adjusted to be increased only in the vicinity of the RF hole.

12. The wireless network as set forth in claim 11, wherein a first of said proxy mobile stations receives and down-converts a first forward channel signal associated with a first target mobile station to thereby produce a first proxy signal, wherein said proxy base transceiver subsystem receives said first proxy signal from said first proxy mobile station, up-converts said first proxy signal to thereby produce a second forward channel signal, and transmits said second forward channel signal to said first target mobile station, and wherein a second of said proxy mobile stations receives and down-converts a third forward channel signal associated with a second target mobile station to thereby produce a second proxy signal.

13. The wireless network as set forth in claim 12, wherein said proxy base transceiver subsystem is further capable of receiving said second proxy signal from said second proxy mobile station, up-converting said second proxy signal to thereby produce a fourth forward channel signal, and transmitting said fourth forward channel signal to said second target mobile station.

14. The wireless network as set forth in claim 13, wherein said proxy base transceiver subsystem is further capable of receiving a first reverse channel signal from said first target mobile station, down-converting said first reverse channel signal to thereby produce a third proxy signal.

15. The wireless network as set forth in claim 14, wherein said first proxy mobile station is capable of receiving said third proxy signal from said proxy base transceiver subsystem, up-converting said third proxy signal to thereby produce a second reverse channel signal, and transmitting said second reverse channel signal to said first base station.

16. The wireless network as set forth in claim 15, wherein said proxy base transceiver subsystem is further capable of receiving a third reverse channel signal from said second target mobile station, down-converting said third reverse channel signal to thereby produce a fourth proxy signal.

17. The wireless network as set forth in claim 16, wherein said second proxy mobile station is capable of receiving said fourth proxy signal from said proxy base transceiver subsystem, up-converting said fourth proxy signal to thereby produce a fourth reverse channel signal, and transmitting said fourth reverse channel signal to said first base station.

18. The wireless network as set forth in claim 17, further comprising a controller capable of assigning said first proxy mobile station to process forward and reverse channel signals associated with said first target mobile station and capable of assigning said second proxy mobile station to process forward and reverse channel signals associated with said second target mobile station.

19. The wireless network as set forth in claim 18, wherein said controller programs said first proxy mobile station with a first Electronic Serial Number associated with said first target mobile station.

20. The wireless network as set forth in claim 19, wherein said controller programs said second proxy mobile station with a second Electronic Serial Number associated with said second target mobile station.

21. For use in a wireless network, a method of retransmitting forward channel and reverse channel signals between a base station of the wireless network and a plurality of mobile stations accessing the wireless network, the method comprising the steps of:

in a plurality of proxy mobile stations dynamically configured to serve as substitutes for a first set of mobile stations within a radio frequency hole and a coverage area of said proxy translator, (i) receiving a first set of forward channel signals transmitted by said base station to said first set of mobile stations, (ii) receiving a second set of forward channel signals transmitted by said base station to a second set of mobile stations, and (iii) down-converting said first set of forward channel signals to produce a plurality of proxy signals, said second set of forward channel signals remaining unprocessed; and in a proxy base transceiver subsystem, (i) receiving said proxy signals from said proxy mobile stations, (ii) up-converting said proxy signals to produce a third set of forward channel signals based on said first set of forward channel signals, and (iii) transmitting said third set of forward channel signals to said first set of mobile stations, and wherein said proxy translator fails to transmit signals based on said second set of forward channel signals to said second set of mobile stations, wherein the proxy base transceiver subsystem determines that said first set of mobiles stations are near or within an RF hole, transmits said third set of forward channel signals to said first set of mobile stations, and adjusts the power used to transmit the third set of forward channels transmitted to said first set of mobile stations so it does not create interference with the base station, and wherein the power is adjusted to be increased in the vicinity of the RF hole.

22. The method as set forth in claim 21, further comprising the steps:

in a first proxy mobile station configured to serve as a substitute for one of said plurality of mobile stations, receiving and down-converting a first forward channel signal associated with a first target mobile station to thereby produce a first proxy signal;

in the proxy base transceiver subsystem, receiving and up-converting the first proxy signal to thereby produce a second forward channel signal and transmitting the second forward channel signal to the first target mobile station; and in a second proxy mobile station, of receiving and down-converting a third forward channel signal associated with a second target mobile station to thereby produce a second proxy signal.

23. The method as set forth in claim 22, further comprising the steps, in the proxy base transceiver subsystem, of receiving and up-converting the second proxy signal to thereby produce a fourth forward channel signal, and transmitting the fourth forward channel signal to the second target mobile station.

24. The method as set forth in claim 23, further comprising the steps, in the proxy base transceiver subsystem, of receiving a first reverse channel signal from the first target mobile station and down-converting the first reverse channel signal to thereby produce a third proxy signal.

25. The method as set forth in claim 24, further comprising the steps, in the first proxy mobile station, of receiving the third proxy signal from the proxy base transceiver subsystem, up-converting the third proxy signal to thereby produce a second reverse channel signal, and transmitting the second reverse channel signal to the base station.

26. The method as set forth in claim 25, further comprising the steps, in the proxy base transceiver subsystem, of receiving a third reverse channel signal from the second target mobile station and down-converting the third reverse channel signal to thereby produce a fourth proxy signal.

27. The method as set forth in claim 26, further comprising the steps, in the second proxy mobile station, of receiving the fourth proxy signal from the proxy base transceiver subsystem, up-converting the fourth proxy signal to thereby produce a fourth reverse channel signal, and transmitting the fourth reverse channel signal to the base station.

\* \* \* \* \*